US011333116B2

(12) United States Patent
Bhat et al.

(10) Patent No.: US 11,333,116 B2
(45) Date of Patent: May 17, 2022

(54) WATER DRAIN MECHANISM FOR FILTER ASSEMBLIES

(71) Applicant: CUMMINS FILTRATION IP, INC., Columbus, IN (US)

(72) Inventors: Mahesh Suhas Bhat, Pune (IN); Peter K. Herman, Stoughton, WI (US); Vivek Mani Tripathi, Gorakhpur (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 190 days.

(21) Appl. No.: 16/761,075

(22) PCT Filed: Nov. 2, 2018

(86) PCT No.: PCT/US2018/058924
§ 371 (c)(1),
(2) Date: May 1, 2020

(87) PCT Pub. No.: WO2019/094293
PCT Pub. Date: May 16, 2019

(65) Prior Publication Data
US 2020/0347809 A1 Nov. 5, 2020

Related U.S. Application Data

(60) Provisional application No. 62/582,485, filed on Nov. 7, 2017.

(51) Int. Cl.
*F02M 37/24* (2019.01)
*F02M 37/32* (2019.01)
(Continued)

(52) U.S. Cl.
CPC .......... *F02M 37/24* (2019.01); *B01D 17/0214* (2013.01); *B01D 17/12* (2013.01);
(Continued)

(58) Field of Classification Search
CPC ................ B01D 17/0214; B01D 17/12; B01D 2201/16; B01D 2201/208;
(Continued)

(56) References Cited

U.S. PATENT DOCUMENTS

| 1,504,006 A | 8/1924 | Weaver |
| 2,215,697 A | 9/1940 | Hansen |

(Continued)

FOREIGN PATENT DOCUMENTS

| CN | 1379695 A | 11/2002 |
| CN | 1138140 A | 2/2004 |

(Continued)

OTHER PUBLICATIONS

International Search Report for PCT Application No. PCT/US2018/058924, dated Jan. 4, 2019, pp. 1-2.
(Continued)

*Primary Examiner* — Terry K Cecil
(74) *Attorney, Agent, or Firm* — Foley & Lardner LLP

(57) ABSTRACT

A water drain assembly for draining water from a filter assembly comprises a conduit, a water canister, and a venturi. The conduit fluidly connects a bottom portion of the filter assembly to a bottom portion of the water canister. The venturi comprises a first venturi inlet that allows fluid to flow from the fuel tank and into the venturi, a second venturi inlet that allows fluid to flow from the water canister and into the venturi, and a venturi outlet that allows fluid to flow from the venturi and into the filter assembly. The second venturi may comprise a capillary.

23 Claims, 9 Drawing Sheets

(51) Int. Cl.
| | |
|---|---|
| *B01D 17/02* | (2006.01) |
| *B01D 17/12* | (2006.01) |
| *B01D 36/00* | (2006.01) |
| *B01D 36/04* | (2006.01) |
| *B60K 15/03* | (2006.01) |
| *F02M 37/04* | (2006.01) |

(52) U.S. Cl.
CPC .......... *B01D 36/006* (2013.01); *B01D 36/04* (2013.01); *B60K 15/03* (2013.01); *F02M 37/04* (2013.01); *F02M 37/32* (2019.01); *B01D 2201/16* (2013.01); *B01D 2201/208* (2013.01); *B60K 2015/0325* (2013.01); *B60K 2015/03236* (2013.01)

(58) Field of Classification Search
CPC .......... B01D 36/003–008; B01D 36/04; B60K 15/03; B60K 2015/03236; B60K 2015/0325; F02M 37/04; F02M 37/24–28; F02M 37/32
See application file for complete search history.

(56) References Cited

U.S. PATENT DOCUMENTS

| | | | |
|---|---|---|---|
| 2,399,994 A | 5/1946 | Feagin | |
| 2,997,180 A | 8/1961 | Loveday | |
| 3,019,904 A | 2/1962 | Stecher | |
| 3,187,895 A | 6/1965 | Pall et al. | |
| 3,550,776 A | 12/1970 | Hamilton | |
| 3,568,835 A | 3/1971 | Hansen | |
| 4,157,082 A | 6/1979 | Day | |
| 4,335,697 A | 6/1982 | Mclean | |
| 4,427,542 A | 1/1984 | Glover | |
| 4,491,143 A | 1/1985 | Yasuhara | |
| 4,497,714 A | 2/1985 | Harris | |
| 4,562,431 A | 12/1985 | Jahnke et al. | |
| 4,637,351 A | 1/1987 | Pakula | |
| 4,740,299 A | 4/1988 | Popoff et al. | |
| 4,799,504 A | 1/1989 | Scragg et al. | |
| 4,809,934 A | 3/1989 | Rix | |
| 4,846,967 A | 7/1989 | Mcgehee | |
| 4,933,093 A | 6/1990 | Keller | |
| 5,053,120 A | 10/1991 | Mollmann | |
| 5,078,901 A | 1/1992 | Sparrow | |
| 5,462,658 A | 10/1995 | Sem | |
| 5,462,679 A | 10/1995 | Verdegan et al. | |
| 5,534,161 A | 7/1996 | Tarr et al. | |
| 5,788,859 A | 8/1998 | Biere | |
| 6,270,659 B1 | 8/2001 | Bagci et al. | |
| 6,435,142 B2 | 8/2002 | Harvey | |
| 6,444,119 B1 | 9/2002 | Mains, Jr. | |
| 7,267,769 B2 | 9/2007 | Baird | |
| 7,473,353 B2 * | 1/2009 | Giolitti .................. | F02M 37/32 210/86 |
| 7,614,504 B2 | 11/2009 | South et al. | |
| 7,655,140 B2 | 2/2010 | Wieczorek et al. | |
| 7,882,961 B2 | 2/2011 | Menez et al. | |
| 8,784,651 B2 | 7/2014 | Moe | |
| 8,840,069 B2 | 9/2014 | Minty | |
| 9,353,713 B2 | 5/2016 | Terry et al. | |
| 2002/0170545 A1 | 11/2002 | Ekstam | |
| 2006/0065601 A1 | 3/2006 | Baird | |
| 2006/0086649 A1 | 4/2006 | Wieczorek et al. | |
| 2007/0119859 A1 | 5/2007 | Harrell | |
| 2008/0230146 A1 | 9/2008 | Kastner et al. | |
| 2009/0288998 A1 | 11/2009 | Jaeger et al. | |
| 2011/0168621 A1 | 7/2011 | Wieczorek et al. | |
| 2012/0000858 A1 | 1/2012 | Butler et al. | |
| 2013/0048754 A1 | 2/2013 | Ortlepp et al. | |
| 2013/0288585 A1 | 10/2013 | Hoke et al. | |
| 2014/0272631 A1 | 9/2014 | Sanderson et al. | |

FOREIGN PATENT DOCUMENTS

| | | |
|---|---|---|
| CN | 101027114 A | 8/2007 |
| CN | 101052453 | 10/2007 |
| CN | 103052524 | 4/2013 |
| CN | 105508101 A | 4/2016 |
| DE | 32 17 162 | 11/1983 |
| DE | 37 40 804 | 7/1989 |
| DE | 37 40 804 C1 | 7/1989 |
| DE | 10302057 | 7/2004 |
| DE | 10334042 A1 | 2/2005 |
| EP | 0 260 069 A2 | 3/1988 |
| EP | 0 278 755 | 8/1988 |
| EP | 0 738 528 | 10/1996 |
| EP | 0 800 708 | 10/1997 |
| EP | 0 806 564 | 11/1997 |
| EP | 2 078 845 A1 | 7/2009 |
| GB | 2 129 329 | 5/1984 |
| JP | 56-006060 | 1/1981 |
| JP | 03-105054 | 5/1991 |
| WO | WO-96/20508 | 7/1996 |
| WO | WO-01/34273 | 5/2001 |
| WO | WO-2006/043817 A1 | 4/2006 |
| WO | WO-2006/080875 A1 | 8/2006 |

OTHER PUBLICATIONS

Written Opinion for PCT Application No. PCT/US2018/058924, dated Jan. 4, 2019, pp. 1-6.
First office action issued for Chinese patent publication No. CN 2018800705757 dated May 17, 2021, with translation, 10 pages.
First Office Action issued for Indian Patent Application No. IN 201947004201, dated Jul. 30, 2020, 8 pages.
Hanson, Blaine, Injection Devices for Fertigation, Department of Land, Air and Water Resources University of California. Davis 4 paqes not dated.
International Search Report and Written Opinion issued for PCT/US2012/070050, dated Apr. 22, 2013, 13 pages.
International Search Report and Written Opinion issued for PCT/US2016/045175, dated Jan. 24, 2017, 18 pages.
Pump Basics How A Centrifugal Pump Works, A.Y. McDonald Mfg. Co., Apr. 1998, 6 pages.
First Office Action issued in Chinese Patent Application No. 201280057841.5, dated May 27, 2015, 9 pages.
Translation of First Office Action issued in Chinese Patent Application No. 201280057841.5, dated May 27, 2015, 14 pages.
Foreign Action other than Search Report on CN 2016800878954 dated Mar. 1, 2021.
U.S. Office Action on U.S. Appl. No. 16/321,331 dated Aug. 2, 2021.

* cited by examiner

WATER DRAIN MECHANISM FOR FILTER ASSEMBLIES

CROSS-REFERENCE TO RELATED PATENT APPLICATIONS

The present application is the U.S. national phase of PCT Application No. PCT/US2018/058924, filed Nov. 2, 2018, which claims priority to and benefit of U.S. Provisional Application No. 62/582,485, filed Nov. 7, 2017 and entitled "Water Drain Mechanism for Filter Assemblies," the disclosures of which are hereby incorporated herein by reference in their entireties.

TECHNICAL FIELD

The present invention relates generally to removal of separated water in fuel filter assemblies and the like.

BACKGROUND

In fuel systems, the filter assembly separates water from the fuel. This water accumulates at the bottom of the filter assembly due to gravity. As the water level rises within the filter assembly, the water can eventually damage the filter media and can even escape through the filter outlet and into the injectors of the fuel injection system. Such actions may cause permanent damage to the injectors as well as warranty issues. Accordingly, the water must be removed from the filter assembly in order to preserve the integrity of the fuel systems, Water removal mechanisms are therefore a major factor in governing the reliability of fuel systems, such as fuel injection systems and the engine as a whole.

In order to remove water from the filter assembly, the filter assembly may be manually drained by the user (e.g., the driver of the vehicle). However, the user may not be sufficiently trained, and some users may simply ignore a signal to drain the water, which may cause the water level in the filter assembly to rise and damage the fuel system. Alternatively, an automatic water drain solution may be used to drain the water from the filter assembly so that the user does not have to manually drain the separated water from the filter assembly. However, automated systems with various electronics and/or electronic controls are very expensive and therefore often cannot be implemented in a cost-effective manner.

Other conventional fuel systems use a jet pump driven by pressurized fuel to push the water back into the fuel tank. More specifically, the jet pump uses energy to pull the water or fuel from the filter assembly by using suction, and the water is returned to the fuel tank, which may be at atmospheric pressure. However, the water then has to be drained through the fuel tank. Furthermore, since a high velocity jet flow is used to force the water out of the filter assembly and a high shear stress is created, the water may re-emulsify with the fuel.

SUMMARY

Various embodiments provide for a water drain assembly for draining water from a filter assembly that comprises a conduit, a water canister, and a venturi. The conduit fluidly connects a bottom portion of the filter assembly to a bottom portion of the water canister. The venturi comprises a first venturi inlet that allows fluid to flow from the fuel tank and into the venturi, a second venturi inlet that allows fluid to flow from the water canister and into the venturi, and a venturi outlet that allows fluid to flow from the venturi and into the filter assembly.

Various other embodiments provide for a fuel system that comprises a fuel tank configured to contain fuel to be filtered, a filter assembly filtering the fuel from the fuel tank, a pump that draws the fuel through the filter assembly, and a water drain assembly for draining water from the filter assembly. The water drain assembly comprises a conduit, a water canister, and a venturi. The conduit fluidly connects a bottom portion of the filter assembly to a bottom portion of the water canister. The venturi comprises a first venturi inlet that allows fluid to flow from the fuel tank and into the venturi, a second venturi inlet that allows fluid to flow from the water canister and into the venturi, and a venturi outlet that allows fluid to flow from the venturi and into the filter assembly.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

Figure 1:
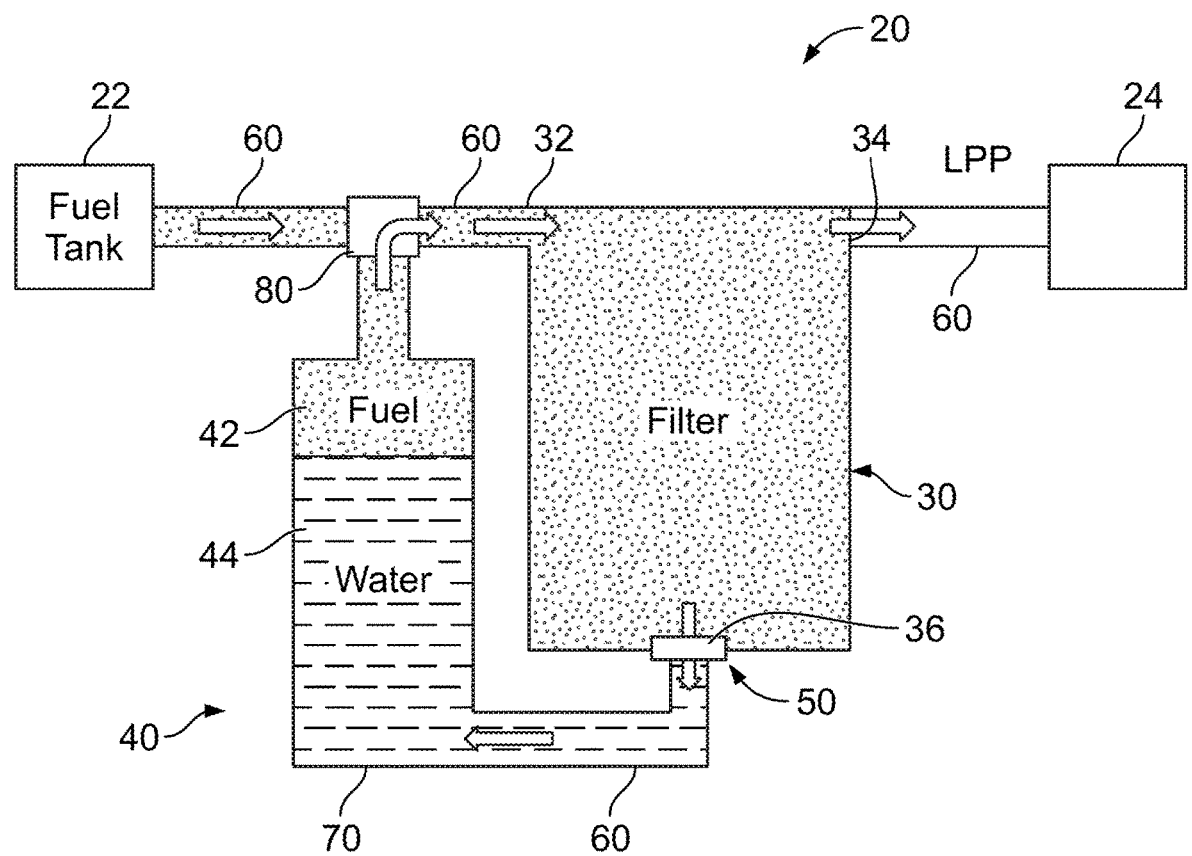
FIG. 1 is a schematic view of a fuel system according to one embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the figures generally, various embodiments disclosed herein relate to a fuel system with a filter assembly and an automatic water drain assembly. The water drain assembly automatically relocates separated water from the filter assembly by utilizing suction between a venturi of the water drain assembly and a filter inlet of the filter assembly. The water drain assembly then stores the water in a water canister, which can be drained during regular filter servicing. Accordingly, the water canister 70 can be serviced (and thereby drained) at the same time as the filter assembly 30 is being serviced. Since the water drain assembly only needs to be drained during regular filter servicing, the fuel system no longer requires manual draining (which is unreliable and cumbersome) or an automated drain system (which is much more expensive) between service intervals.

Since the water drain assembly is a closed loop system and does not require any electronics, the water drain assembly is relatively low cost and robust. Furthermore, the water drain assembly is easily integrated into existing fuel systems such that only minimal changes to the existing fuel system are required for installation (e.g., only the bottom drain of the filter assembly needs to be changed). Additionally, the modular design of the water drain assembly allows the water drain assembly to fit with almost all bottom load filter assemblies. Such embodiments may provide the benefit of a low-cost, automated system to drain water from filter assemblies such as fuel filter assemblies.

Fuel System

As shown in FIG. 1, a fuel system 20 comprises a fuel tank 22 that contains or holds fuel 42 to be filtered, a filter assembly 30 that filters the fuel 42 from the fuel tank 22, a water drain assembly 40 that relocates water 44 from the filter assembly 30, and a pump 24 (such as a low pressure pump) that draws filtered fuel 42 through the filter assembly 30 and out of the filter assembly 30 through the filter outlet 34. The pump 24 is downstream from the rest of the fuel system 20 (e.g., downstream from the filter outlet 34 of the filter assembly 30 and the water drain assembly 40). FIGS. 2-5 show various configurations and embodiments of portions of the fuel system 20.

The fuel system 20 can be used within a variety of different applications, including heavy duty applications in price-sensitive regions where water content is high (e.g., in trucks used in mining applications in China).

Filter Assembly

The filter assembly 30 is configured to filter a fluid. According to one embodiment, the fluid is a liquid such as fuel 42 and the filter assembly 30 is a filter water separator (FWS) that separates water 44 from the fuel 42. Although fuel is referred to herein, it is understood that another fluid may be filtered by the filter assembly 30 and moved through the fuel system 20.

The filter assembly 30 has a filter inlet 32 in which fluid (i.e., the fuel 42) can flow into the filter assembly 30 to be filtered and a filter outlet 34 through which fluid can flow out from the filter assembly 30 after filtration. The filter assembly 30 also includes a bottom drain 36 positioned at the bottom of the filter assembly 30 that attaches to the water drain assembly 40. As described further herein, water 44 that has been separated from the fuel 42 is drained from the filter assembly 30 through the bottom drain 36 and into the water drain assembly 40. The bottom of the filter assembly 30 may be a sump.

Water Drain Assembly

The water drain assembly 40 drains water 44 that has been separated from the fuel 42 from the filter assembly 30 and accordingly comprises a check valve 50, at least one conduit (in the form of a hose 60 according to example embodiments), a water canister 70, and a venturi 80. As described further herein, with the water drain assembly 40, fuel 42 flows from the fuel tank 22, through the venturi 80, into the filter inlet 32 of the filter assembly 30 where water 44 is separated from the fuel 42 and sinks to the bottom of the filter assembly 30. The water 44 then flows through the check valve 50, through the hose 60, and into the water canister 70, and fuel 42 already present in the water canister 70 flows through a capillary 88 of the venturi 80 and into the filter inlet 32 of the filter assembly 30.

The water removal or drain assembly 40 automatically and continuously relocates separated water 44 from the bottom of the filter assembly 30 (i.e., from the suction side of the filter assembly 30) and draws the water 44 into the water canister 70 by utilizing inlet suction created by the fluid flow at the filter inlet 32 of the filter assembly 30 and the venturi 80. The water drain assembly 40 stores the water 44 in the water canister 70 outside of the filter assembly 30 (including outside of any sump of the filter assembly 30) in order to be later drained.

Since the water drain assembly 40 is automated and driven by the suction created by fluid entering into the filter assembly 30, the water drain assembly 40 continuously relocates the water 44 from the water drain assembly 40 and into the water canister 70 when the filter assembly 30 is being used, and the water drain assembly 40 does not require the user to manually drain the water 44 from the filter assembly 30. Instead, water 44 can be drained from the water canister 70 during regular filter servicing. Furthermore, since the water drain assembly 40 continuously draws the water 44 (or fuel 42 if there is no water 44) out from the filter assembly 30, the water drain assembly 40 ensures that no water accumulates at the bottom of the filter assembly 30, which protects the filter assembly 30 (as well as the rest of the fuel system 20) from damage.

As shown in FIGS. 1-5, the entire water drain assembly 40 is positioned or located after or downstream of the fuel tank 22 and before or upstream of the pump 24. The water drain assembly 40 is positioned downstream of the filter assembly 30 such that fluid flows into the conduit of the water drain assembly 40 from the bottom portion of the filter assembly 30 after flowing through and being filtered by the filter assembly 30. The venturi 80 of the water drain assembly 40 directs fluid from within the water canister 70 to flow back into the filter assembly 30, thereby creating a closed loop. Since the water drain assembly 40 is a closed loop, the water drain assembly is very robust.

Various fittings may be used to fit the various component to each other and to the filter assembly 30. For example, various fittings may be used with the filter assembly 30, the check valve 50, the hose 60, the water canister 70, and the venturi 80.

Cheek Valve and Hose

Figure 6:
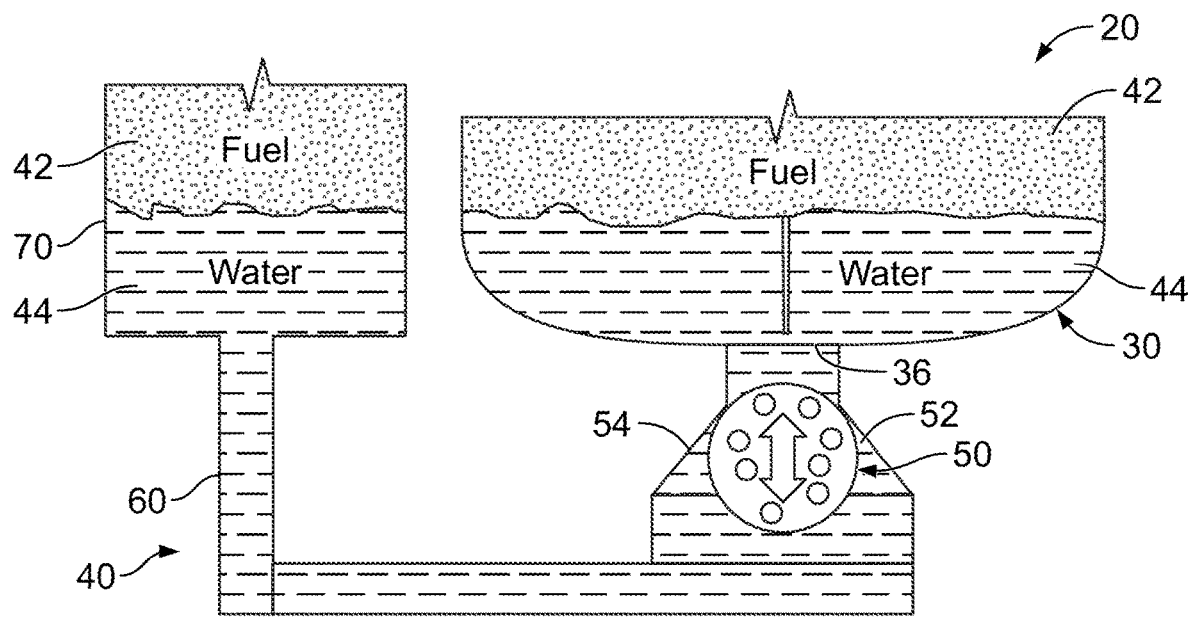
FIG. 6 is a schematic view of a portion of a fuel system according to one embodiment.

As shown in FIG. 6, the water at the bottom of the filter assembly 30 and at the bottom of the water canister 70 attempt to "re-level" itself between the filter assembly 30 and the water canister 70 when the fuel system 20 is turned off (e.g., during shutoff). Accordingly, fluid (water 44 or fuel 42) may try to flow backward from the water canister 70 back into the filter assembly 30, and may reach a common level between a reservoir and a filter housing included in the filter assembly 30. In order to prevent this backflow, the check valve 50 is positioned at the bottom of the filter assembly 30 upstream of the conduit and fluidly connects to the bottom drain 36 of the filter assembly 30. The check valve 50 allows fluid in the bottom of the filter assembly 30 to flow out from the filter assembly 30 and into the hose 60 (in order to flow into the water canister 70), but stops or prevents the re-entry of any fluid (e.g., the fuel 42 or the water 44) back into the filter assembly 30. If the water canister 70 is full of water and is not drained, the check valve 50 prevents excess water from being recirculated back into the filter assembly 30.

Depending on the configuration of the check valve 50, the check valve 50 may only allow fluid to be removed from the bottom of the filter assembly 30 when water 44 has collected at the bottom of the filter assembly 30 or alternatively may allow fluid (i.e., fuel 42) to be removed from the bottom of the filter assembly 30 even when water 44 has not collected at the bottom of the filter assembly 30. The check valve 50 prevents any type of fluid (e.g., water 44 or fuel 42) from flowing back into the filter assembly 30, regardless of whether or not water 44 has collected at the bottom of the filter assembly 30.

Figure 7:
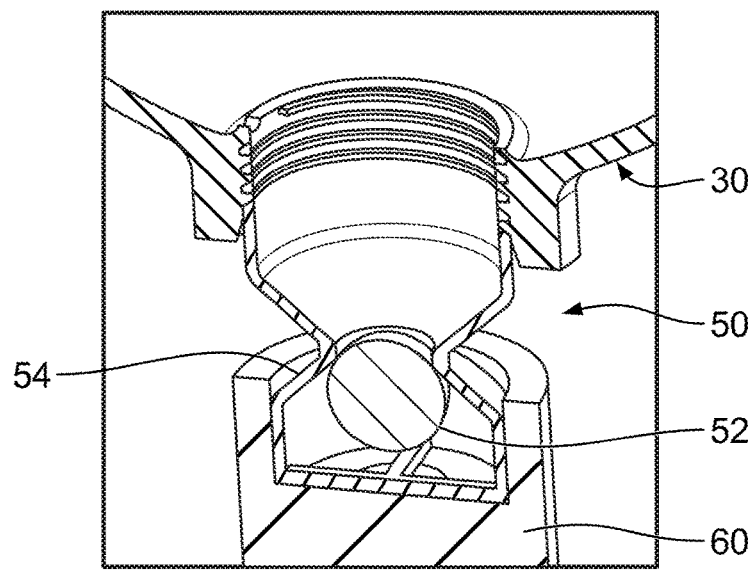
FIG. 7 is a cross-sectional, perspective view of the check valve of the fuel systems of FIGS. 3 and 5.

FIGS. 6 and 7 show one embodiment of the check valve 50 in which the check valve 50 is a float check valve that comprises an air-bubble injected polymer ball 52 positioned under a conical seat 54. The ball 52 may have a density lower than water 44 and/or fuel 42. For example, the density of the ball 52 may be less than approximately 0.9 grams per cubic centimeter (g/cc) and preferably less than 0.5 glee. Accordingly, in water, the ball 52 quickly rises or floats upward to the conical seat 54 when there is no or extremely small fluid flow (e.g., during shutdown) through the fuel system 20, which closes off the check valve 50 and prevents any fluid from backfilling into the filter assembly 30 through the bottom drain 36 during shutdown. When flow through the fuel system 20 (and specifically the venturi 80) resumes, the ball 52 is pulled down and away from the conical seat 54, which opens up the check valve 50 and allows fluid to flow from the filter assembly 30 into the water canister 70. Even if there is no water 44 in the bottom of the filter assembly 30 (and therefore only fuel 42 in the bottom of the filter assembly 30), the ball 52 can still easily be pulled down and away from the conical seat 54 once fluid starts to flow through the venturi 80 (which creates the inlet suction to remove fluid from the filter assembly 30) since the ball 52 is small and has a small buoyancy force.

The tubing or hose 60 (e.g., a flexible hose) fluidly connects and is positioned between the check valve 50 and the inlet to the water canister 70. Accordingly, the hose 60 fluidly connects and directs fluid from the bottom portion of the filter assembly 30 to the bottom portion of the water canister 70. The hose 60 is attached to a bottom portion of the water canister 70. Other hoses 60 may be used within the fuel system 20 and connect various components of the fuel system 20. For example, other hoses 60 may fluidly connect the water canister 70 to the capillary 88 of the venturi 80, the fuel tank 22 to the inlet of the venturi 80, the outlet of the venturi 80 to the filter inlet 32 of the filter assembly 30, and/or the filter outlet 34 of the filter assembly 30 to the pump 24.

Water Canister

As shown in FIG. 2-6, the water storage unit, collector, or canister 70 provides a separate storage area from the filter assembly 30 for fluid (i.e., fuel 42 and/or water 44) to be held, stored, or contained until the water canister 70 is drained during a regular filter servicing. The water canister 70 is initially filled with fuel 42, which is slowly replaced by water 44 as separated water 44 from the filter assembly 30 slowly fills the water canister 70.

Figure 2:
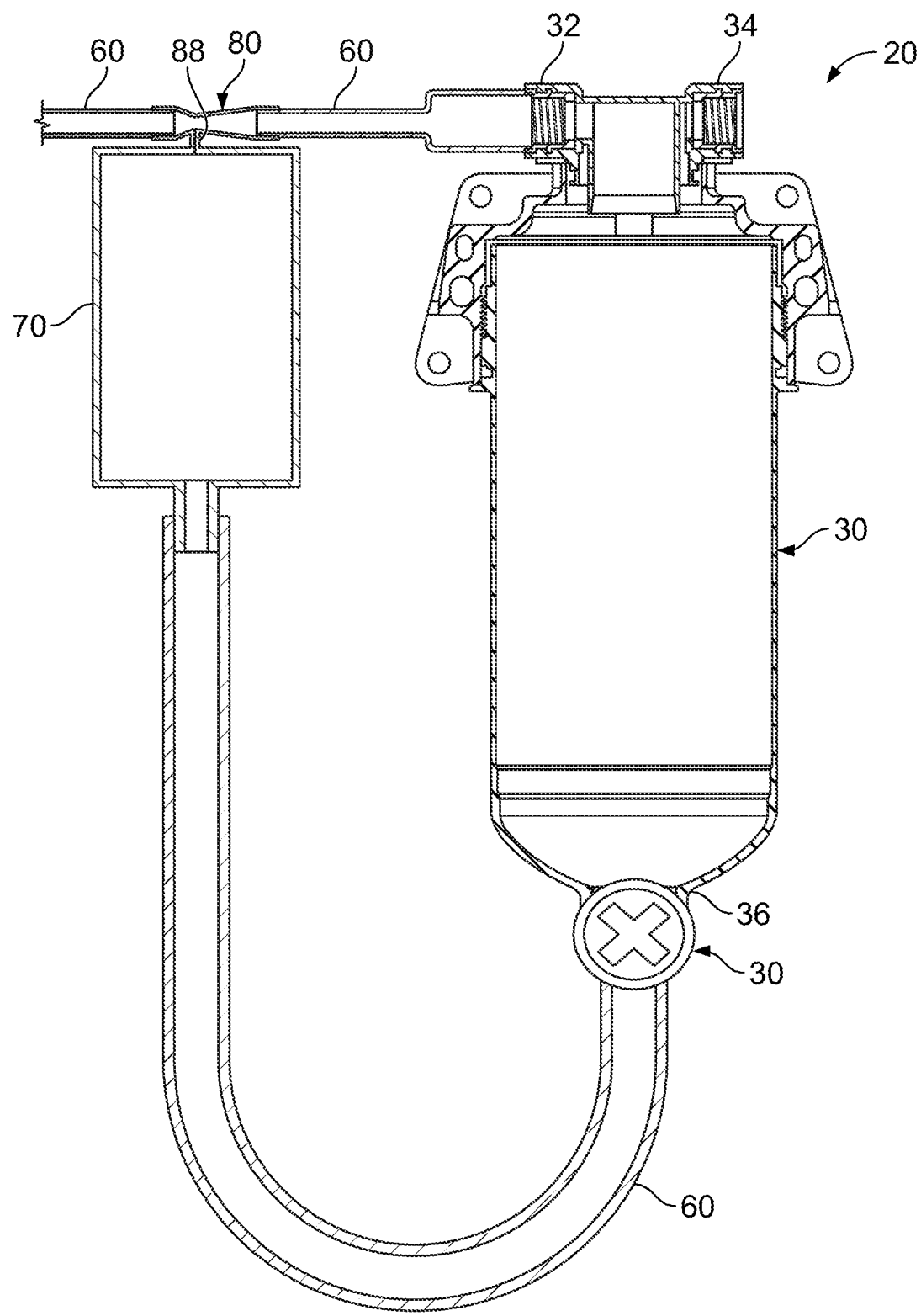
FIG. 2 is a cross-sectional view of a fuel system according to another embodiment.
Figure 3:
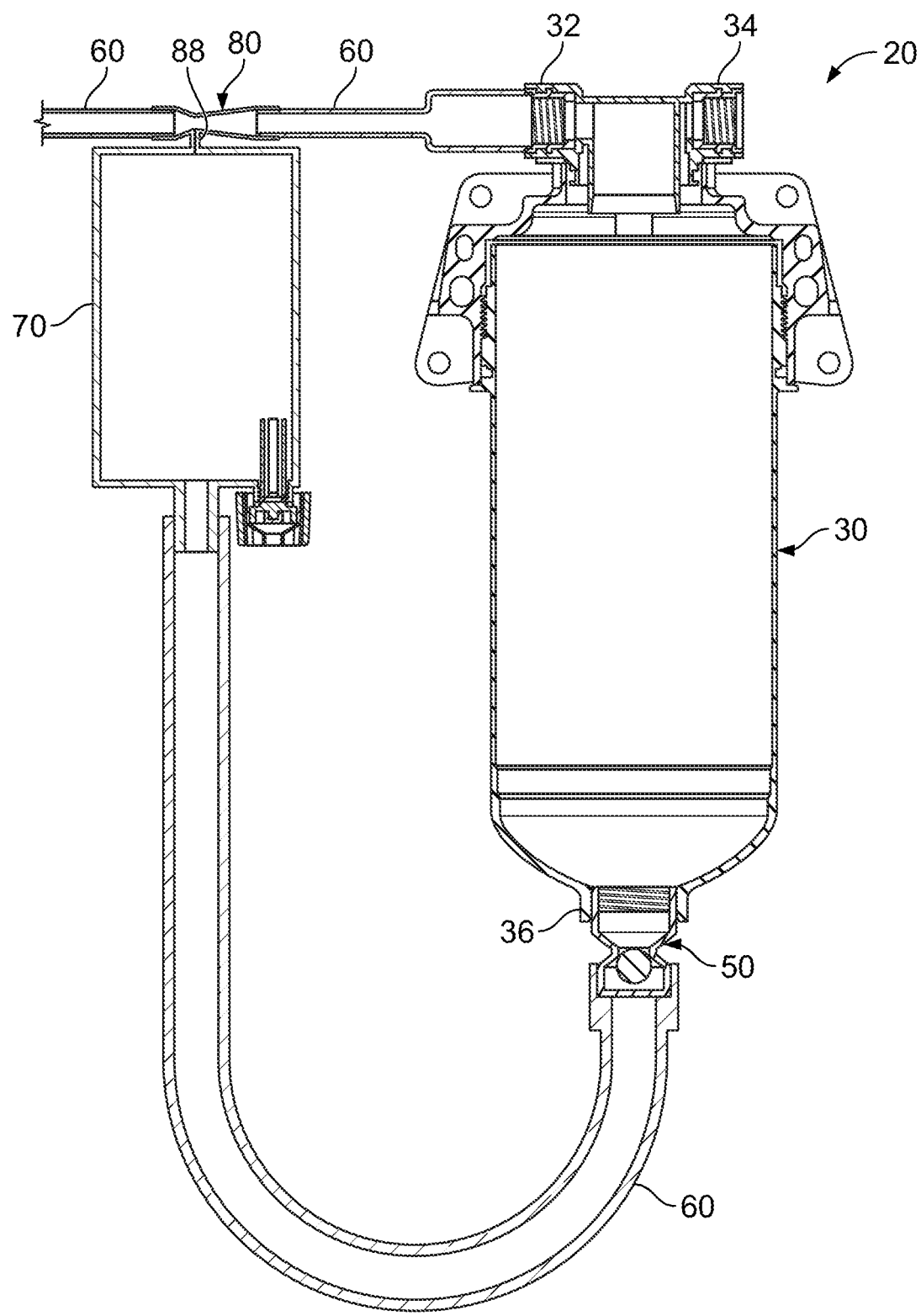
FIG. 3 is a cross-sectional view of a fuel system according to yet another embodiment.
Figure 4:
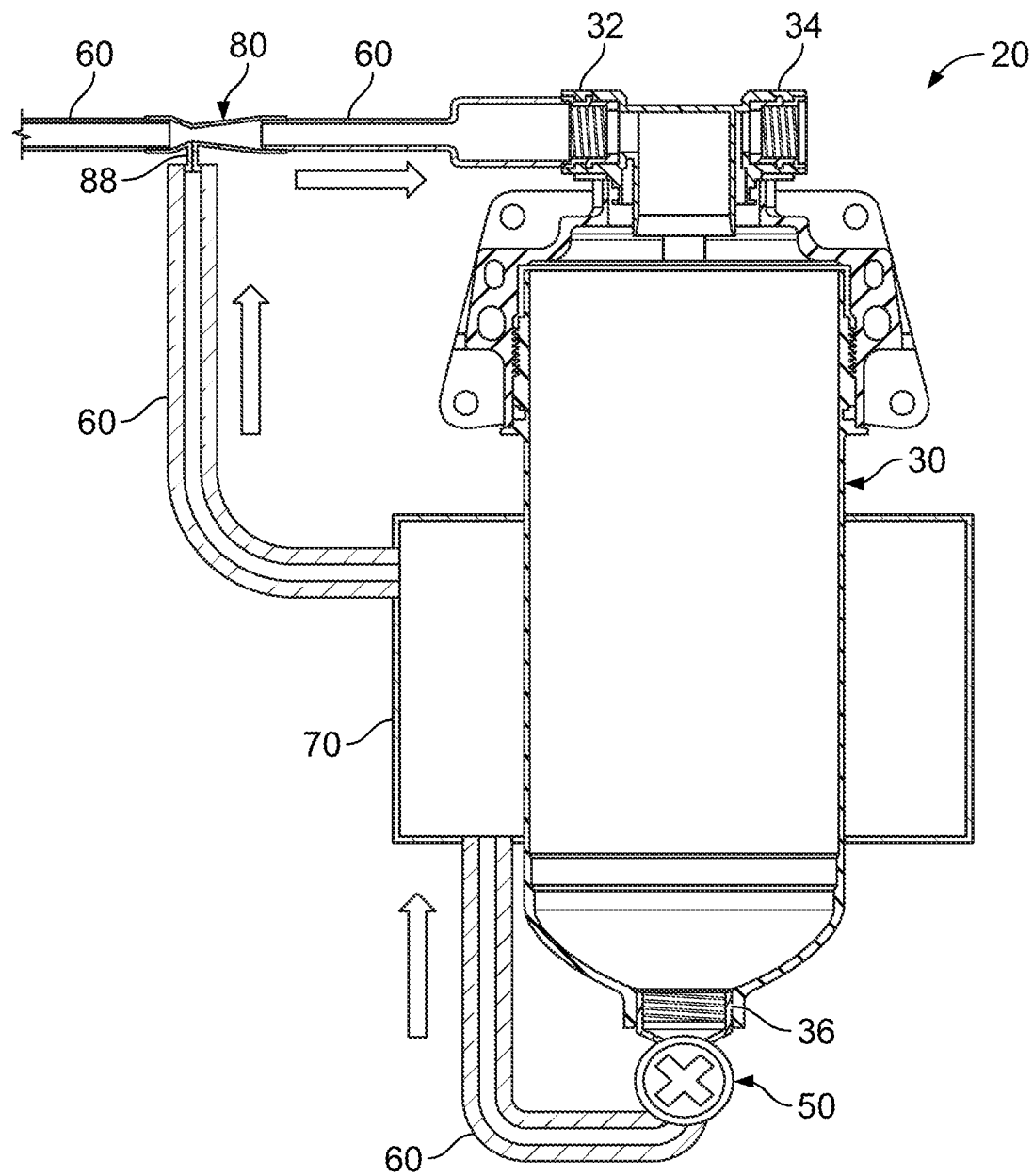
FIG. 4 is a cross-sectional view of a fuel system according to still another embodiment.
Figure 5:
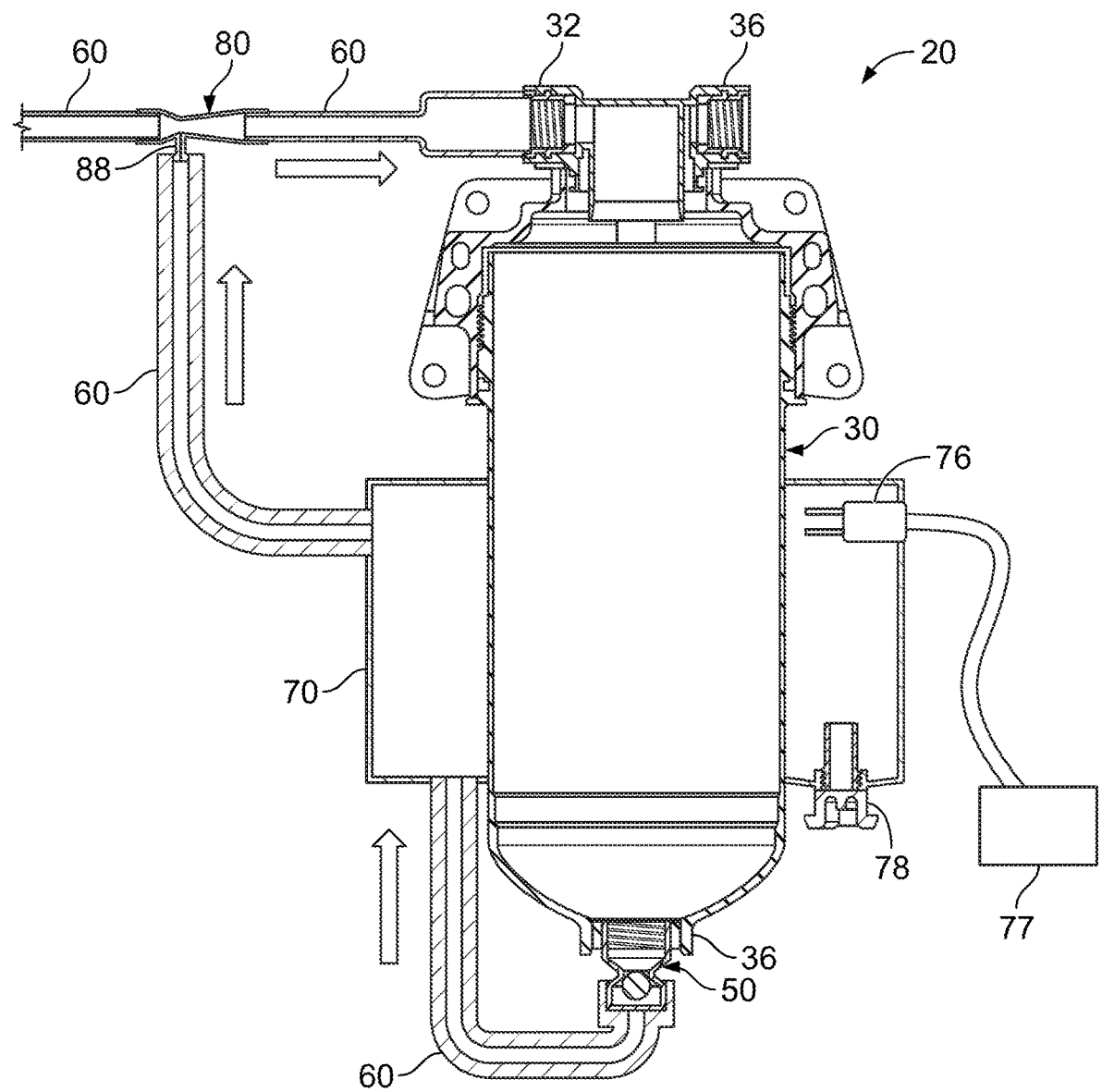
FIG. 5 is a cross-sectional view of a fuel system according to another embodiment.

The size and shape of the water canister 70 is independent from the filter assembly 30 and can be chosen based on the application. For example, FIGS. 2-3 show a water canister 70 that, and FIGS. 4-5 show another water canister 70 that that has a different shape than the water canister 70 of FIGS. 2-3 (e.g., a donut shape). The water canister 70 is sized to be large enough to hold a sufficient amount of water such that the water canister 70 only needs to be emptied during regular filter servicing.

Figure 8:
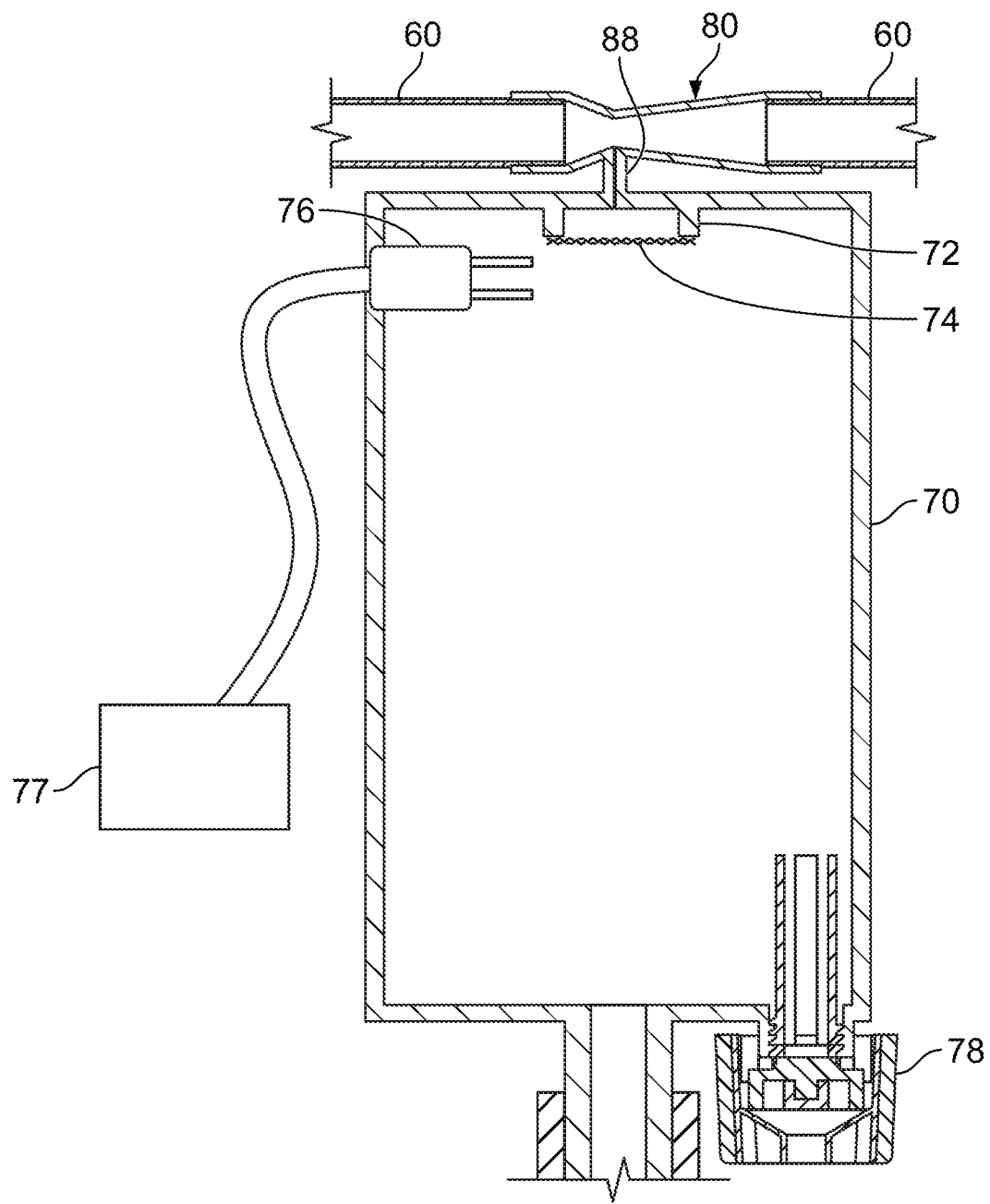
FIG. 8 is a cross-sectional view of a portion of a water drain assembly that can be used within a fuel system according to an embodiment.

According to one embodiment and as shown in FIG. 8, the water canister 70 comprises a manual drain valve 78 in order to allow the water 44 stored within the water canister 70 to be drained during, for example, regular filter servicing. Since the water 44 sinks to the bottom of the water canister 70 while the fuel 42 rises to the top of the water canister 70, the drain valve 78 is positioned along a lower or bottom region or portion of the water canister 70 in order to allow the water 44, specifically, to be drained.

The water canister 70 further comprises and is fitted with a water-in-fuel (WIF) sensor 76 that includes a control box 77. The WIF sensor 76 is positioned in a top portion of the water canister 70 and extends into an inner area within the water canister 70. Accordingly, once the water level within the water canister 70 reaches the top portion of the water canister 70, the WIF sensor 76 will detect the presence of water 44 and will send a signal to the user (e.g., a driver of the vehicle), who can then drain the water canister 70 using the drain valve 78. Normally, the water canister 70 can be drained during a normal filter servicing or based on the application needs.

The water canister 70 may be mounted to a variety of different areas that provide sufficient space and potentially a mounting bracket. For example, the water canister 70 may be mounted next to the filter assembly 30 on the chassis, FIGS. 2-3 show examples of how the water canister 70 can be separate from the filter assembly 30 such that only minimal changes are required to use the water drain assembly 40 with an existing filter assembly 30. FIGS. 4-5 show examples of how the water canister 70 can be positioned directly next to and optionally mounted on the filter assembly 30. As shown in FIGS. 4-5, the water canister 70 is a collecting jacket that is positioned peripherally around at least a portion of an existing filter shell of the filter assembly 30 instead of having the water canister 70 separate from the filter assembly 30. In the fuel systems 20 of FIGS. 4-5, the filter assembly 30 has a relatively stiffer head and mountings in order to be able to withstand the extra weight of the collecting jacket.

Venturi

As shown in FIGS. 1-5, the venturi 80 fluidly connects to and directs fluid flow from the water canister 70 to the filter inlet 32 of the filter assembly 30 as fluid also flows through the venturi 80 from the fuel tank 22 to the filter inlet 32. Accordingly, the venturi 80 fluidly connects the fuel tank 22, the water canister 70, and the filter assembly 30. The flow rate through the venturi 80 depends on the flow rate of the inlet flow from the fuel tank 22 to the filter inlet 32, as well as the size and shape of the various components of the venturi 80.

The venturi 80 comprises a first venturi inlet 86 that allows fluid (i.e., fuel 42) to flow from the fuel tank 22 and into the venturi 80, a second venturi inlet 89 that allows fluid (i.e., fuel 42) to flow from the inside of the water canister 70 and into the venturi 80, and a venturi outlet 96 that allows all fluid within the venturi 80 to flow out from and exit the venturi 80 and enter into the filter inlet 32 of the filter assembly 30, In particular embodiments, the second venturi inlet 89 comprises a capillary 88 (e.g., a capillary tube) that extends into a constricted section 85 of the venturi 80, as described below in further detail. The pump 24 is what initially draws fuel 42 from the fuel tank 22, into the first venturi inlet 86, and through the filter assembly 30. This flow of fluid into and through the venturi 80 through the first venturi inlet 86 creates an inlet suction within the venturi 80, which draws fluid from the water canister 70 and into the venturi 80 through the second venturi inlet 89 (e.g., a capillary). This inlet suction, which draws fuel 42 from the water canister 70, is also therefore what draws water 44 from the bottom of the filter assembly 30 and into the water canister 70.

Figure 9:
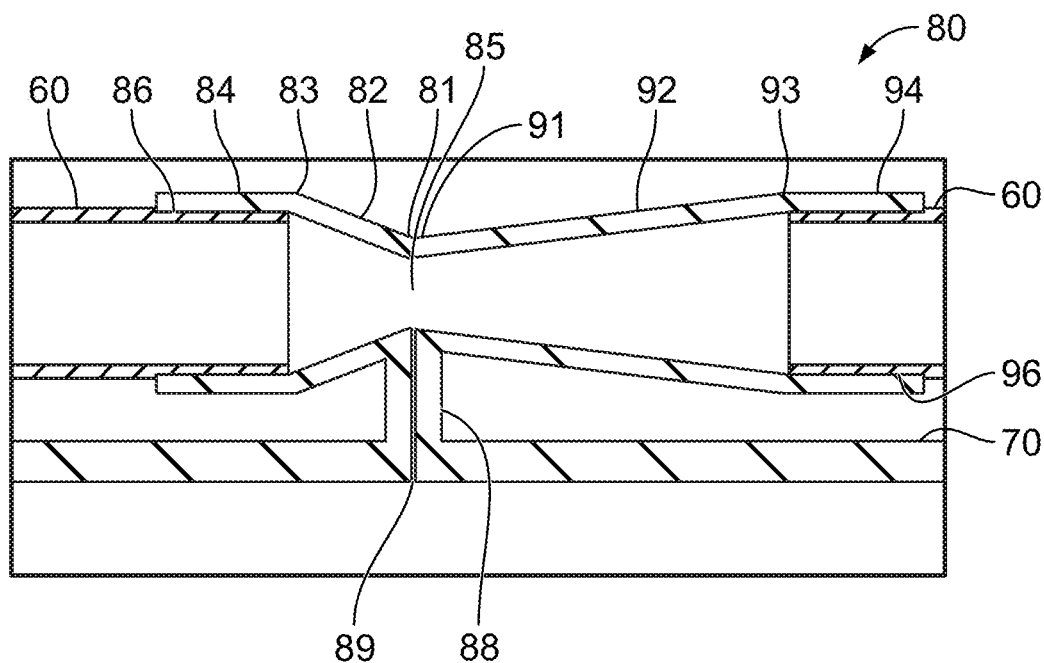
FIG. 9 is a cross-sectional view of a venturi that can be used within the fuel systems of FIGS. 2 and 3.

As shown in FIG. 9, the venturi 80 comprises a first conical section. 82 that extends between a first conical end 81 and a second conical end 83 and a second conical section 92 that extends between a first conical end 91 and a second conical end 93. The first conical end 81 and the first conical end 91 each have a smaller inner diameter than the second conical end 83 and the second conical end 93, respectively. According to one embodiment, the inner diameters of the first conical end 81 and the first conical end 91 are substantially equal and the inner diameters of the second conical end 83 and the second conical end 93 are substantially equal. The first conical section 82 is shorter than the second conical section 92 and therefore has walls at a greater angle than the second conical section 92. However, it is understood that the first conical section 82 and second conical section 92 can be reversed depending on the desired configuration and flow rate.

The first conical end 81 of the first conical section 82 and the first conical end 91 of the second conical section 92 (i.e., the most narrow ends of each of the first conical section 82 and the second conical section 92) are directly attached to each other, Which defines a constricted section 85 along the length of the venturi 80 between the first venturi inlet 86 and the venturi outlet 96. Along the length of the venturi 80, the inner diameter at the constricted section 85 of the venturi 80 is the smallest (and the inner diameter along the first cylindrical section 84 and the second cylindrical section 94 is the largest).

The venturi 80 further comprises a first cylindrical section 84 and a second cylindrical section 94 that extend from the second conical end 83 of the first conical section 82 and the second conical end 93 of the second conical section 92, respectively. The inner diameter of the first cylindrical section 84 is approximately equal to the inner diameter of the first conical section 82 at the second conical end 83 and the inner diameter of the second cylindrical section 94 is approximately equal to the inner diameter of the second conical section 92 at the second conical end 93. The first cylindrical section 84 and the second cylindrical section 94 are each configured to attach with hoses 60 within the fuel system 20. More specifically, the first cylindrical section 84 attaches to a hose 60 that leads directly to the fuel tank 22 and the second cylindrical section 94 attaches to a hose 60 that leads directly to the filter inlet 32 of the filter assembly 30. Accordingly, the first cylindrical section 84 defines the first venturi inlet 86 and the second cylindrical section 94 defines the venturi outlet 96 such that fluid flows from the first venturi inlet 86 at the first cylindrical section 84 to the venturi outlet 96 at the second cylindrical section 94.

As described before, the venturi 80 may comprise a side inlet or capillary 88 that fluidly connects the water canister 70 to the constricted section 85 of the venturi 80 and defines the second venturi inlet 89. The capillary 88 extends directly from the constricted section 85 of the venturi 80 and allows fuel 42 to flow from the water canister 70, into the second venturi inlet 89, through the capillary 88, into the constricted section 85, through the second conical section 92, through the second cylindrical section 94, and through the venturi outlet 96 to the filter inlet 32 of the filter assembly 30. The inner diameter of the capillary 88 is substantially smaller than the inner diameter of any other portion of the venturi 80 (including the constricted section 85) such that the inlet suction created by fluid flowing from the first venturi inlet 86 to the venturi outlet 96 draws a desired flowrate of fluid from the water canister 70, into the second venturi inlet 89, and through the capillary 88 (and out through the venturi outlet 96). The flow rate through the capillary 88 of the venturi 80 depends on the change in pressure between the water canister 70 and the filter inlet 32 of the filter assembly 30. The capillary 88 can be directly attached to the water canister 70 (as shown in FIGS. 2-3) or can be attached to the water canister 70 through one of the hoses 60 (as shown in FIGS. 4-5).

The capillary 88 is positioned at and is fluidly connected to the top of the water canister 70 in order to direct fuel 42 from the water canister 70 to the filter assembly 30, instead of water 44 (since the fuel 42 is less dense then and therefore on top of the water 44 within the top portion of the water canister 70). The capillary 88 may be attached to the top of the water canister 70 directly or through a fitting and/or hose 60.

The venturi 80 is positioned downstream of the fuel tank 22 and upstream of the filter inlet 32 of the filter assembly 30 in order to allow fluid to flow from the fuel tank 22, through the venturi 80, and into the filter assembly 30, which creates an inlet suction through the venturi 80. This inlet suction through the venturi 80 (caused by the inlet flow from the fuel tank 22 to the filter assembly 30) causes fluid to flow out of the water canister 70 and into the filter inlet 32 of the filter assembly 30. More specifically, this inlet suction draws a metered amount of fuel 42 from the water canister 70 into the capillary 88, through the venturi outlet 96, and into the filter inlet 32 of the filter assembly 30, which thereby draws water 44 from the bottom of the filter assembly 30 into the water canister 70. For example, the dimensions of the capillary 88 and venturi 80 (e.g., an internal diameter and length) may be defined so as to define the metered flow.

Figure 10:
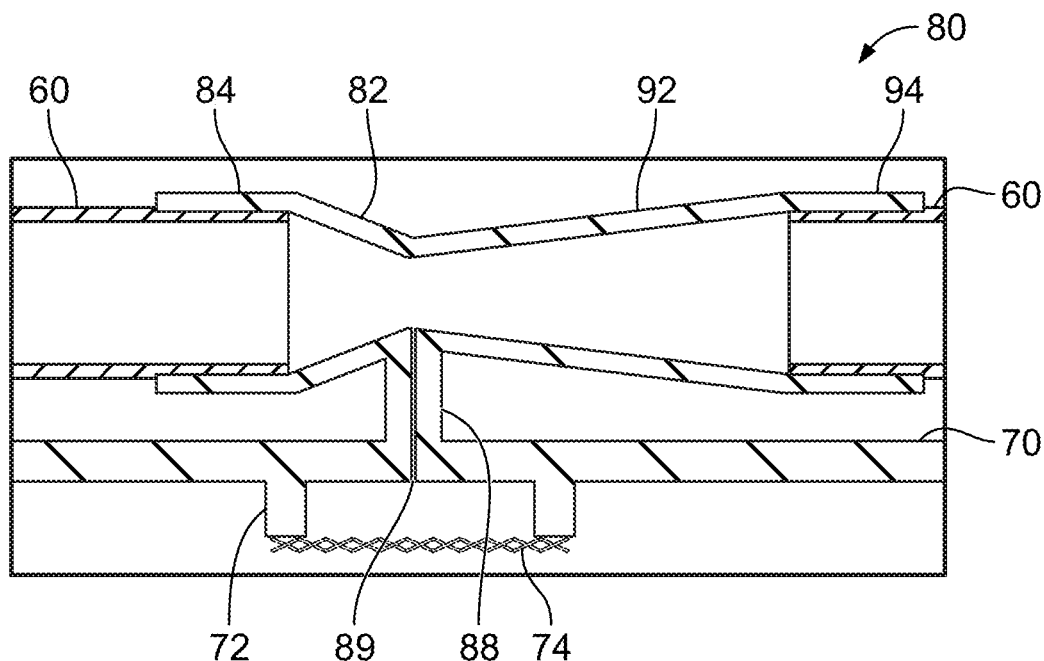
FIG. 10 is a cross-sectional view of a venturi that can be used within the fuel system of FIG. 8.

According to one embodiment and as shown in FIG. 10, the water canister 70 comprises a support ring 72 that is positioned inside the water canister 70, surrounding the second venturi inlet 89 defined by the capillary 88 of the venturi 80. The support ring 72 is on an opposite side of a wall of the water canister 70 from the capillary 88 and thereby extends in an opposite direction from the capillary 88.

The water canister 70 further comprises a filter media patch 74 that is positioned along and attached to the ends of the support ring 72 located distal from the second venturi inlet 89. The filter media patch 74 prevents any particles from entering into and plugging up the capillary 88. The filter media patch 74 may be constructed out of a variety of different materials, including but not limited to fibrous non-woven, sintered porous metal, woven plastic or wire-mesh screen (with a variety of different configurations, including a plain square weave or dutch twill), or other materials with a controlled pore size and porosity. The material of the filter media patch 74 may be selected such that the maximum pore size of the filter media patch 74 is less than the inner diameter of the capillary 88. According to one embodiment, the pore size of the filter media patch 74 may be approximately 0.1 to 0.9 times greater than the inner diameter of the capillary 88. According to another embodiment, the pore size of the filter media patch 74 may be approximately 0.5 times greater than the inner diameter of the capillary 88.

Filter Assembly Water Drainage

As shown in FIG. 1, the fluid through the fuel system 20 flows from the fuel tank 22, into the venturi 80 through the first venturi inlet 86, along the length of the venturi 80, out from the venturi 80 through the venturi outlet 96, and into the filter assembly 30 through the filter inlet 32. The fluid then either exits the filter assembly 30 through the filter outlet 34 as filtered fluid or settles to the bottom of the filter assembly 30 and is drained through the bottom drain 36 of the filter assembly 30, through the check valve 50, through the hose 60, into the bottom of the water canister 70, through the water canister 70, out through the top of the water canister 70, into the venturi 80 through the second venturi inlet 89, through the capillary 88 of the venturi 80, out from the venturi 80 through the venturi outlet 96, and back into the filter assembly 30 through the filter inlet 32.

As a result of inlet suction created by the inlet fluid flow from the fuel tank 22, through the venturi 80, and into the filter assembly 30, the venturi 80 continuously directs and draws fluid from the water canister 70 into the filter inlet 32, which thereby directs and draws fluid from the bottom of the filter assembly 30 into the water canister 70. While the fuel system 20 is in use, the water drain assembly 40 constantly circulates and slowly moves fluid from the bottom of the filter assembly 30 into the water canister 70 and from the water canister 70 into the filter inlet 32 of the filter assembly 30, which creates a closed loop within the fuel system 20, Accordingly, the water 44 collected at the bottom of the filter assembly 30 is slowly moved to and fills the water canister 70 while fuel 42 present in the water canister 70 is slowly moved into the filter assembly 30.

More specifically, initially the filter assembly 30 and the water canister 70 are filled with fuel 42 (which can be from the fuel tank 22). The fuel 42 is sucked into the filter assembly 30 and then into the water canister 70 due to the negative pressure created by the pump 24. As the fuel 42 flows through the filter assembly 30, the filter media of the filter assembly 30 separates out any water 44 from the fuel 42. The separated water 44 collects or settles down at the bottom of the filter assembly 30.

Meanwhile, fuel 42 is flowing from the fuel tank 22, through the first venturi inlet 86, out through the venturi outlet 96, and into the filter inlet 32 of the filter assembly 30 due to negative pressure from the pump 24. As the fuel 42 from the fuel tank 22 flows through the venturi 80, the flow of fuel 42 creates a negative pressure (i.e., inlet suction) that draws the fuel 42 (in the top of the water canister 70) out of the water canister 70, through the venturi 80 (i.e., into the second venturi inlet 89, through the capillary 88, out through the venturi outlet 96), and into the filter inlet 32 of the filter assembly 30, thus joining the fuel 42 flowing from the fuel tank 22. As the fuel 42 moves out of the water canister 70, a negative pressure is created within the water canister 70, which draws or drains fluid (i.e., water 44 and/or fuel 42) out of the bottom of the filter assembly 30 and into the water canister 70. As the fluid (i.e., water 44 and/or fuel 42) at the bottom of the filter assembly 30 is sucked into the water canister 70, the fluid from the filter assembly 30 replaces the fuel 42 in the water canister 70 (that the water canister 70 was initially filled with) and is then stored in the water canister 70 until the water canister 70 is drained during a regular filter servicing. Meanwhile, the check valve 50 prevents water 44 or fuel 42 from flowing back into the filter assembly 30 from the water canister 70.

In order to install the water drain assembly 40 to the filter assembly 30, the check valve 50 is attached to the bottom drain 36 of the filter assembly 30 and the venturi 80 is fluidly attached (via, for example, a fitting) to the fuel tank 22 and the filter inlet 32 of the filter assembly 30.

As described further herein, the fuel system 20 relies on inlet suction that is created from fuel flowing from the fuel tank. 22, through the venturi 80, and into the filter inlet 32 of the filter assembly 30 due to the pump 24 to create the required suction for such fluid flow within the water drain assembly 40. The inlet suction draws or pulls fluid from the top portion of the water canister 70 into the filter assembly 30, which draws or pulls fluid from the bottom portion of the filter assembly 30 into the water canister 70. Since the inlet suction is used to move the fluid, the fuel system 20 (and specifically the water drain assembly 40) does not rely on, require, or use pressure side plumbing and does not need a jet pump to exert a positive pressure into the filter assembly 30 for water drainage.

In various conventional fuel systems that use pressure side plumbing or a jet pump, the separated water may flow to the fuel tank and therefore needs to be drained through the fuel tank. However, in the present fuel system 20, the water 44 is separated out into a separate container (i.e., the water canister 70), which can then be drained during regular filter servicing. Furthermore, in various conventional fuel systems with a jet pump, high velocity fuel forces the water out of the filter assembly, which creates the possibility of re-emulsification due to the high velocity and high shear stress. In the present fuel system 20, however, the water 44 and the fuel 42 do not mix at such a high velocity flow and only fuel is drawn into the venturi 80 from the water canister 70. Therefore, re-emulsification is not an issue in the present fuel system 20.

If a second filter assembly was used to remove the water (instead of the present water drain assembly 40), the cost of the fuel system would be increased and the second filter assembly would be redundant if the first filter assembly can strip water effectively. Furthermore, the sump volume of the filter assembly (which is generally 20-30% of the total filter volume) would be the only volume available for water collection, Which cannot be easily tailored to the specific separated water storage volume requirements of the fuel system (which depends on the application and the fuel quality). Instead, it is easier and quicker to use the present water drain assembly 40, which allows the volume of available separated water storage (i.e., the size of the water canister 70) to be easily modified relative to the size of the filter assembly 30 according to the specific needs of the customer. Furthermore, by using the present water drain assembly 40, the size of the sump of the filter assembly 30 can be minimized or the sump can be completely eliminated, which allows for more space for filter media and/or a shorter shell to be used for the filter assembly 30.

Figure 11A:
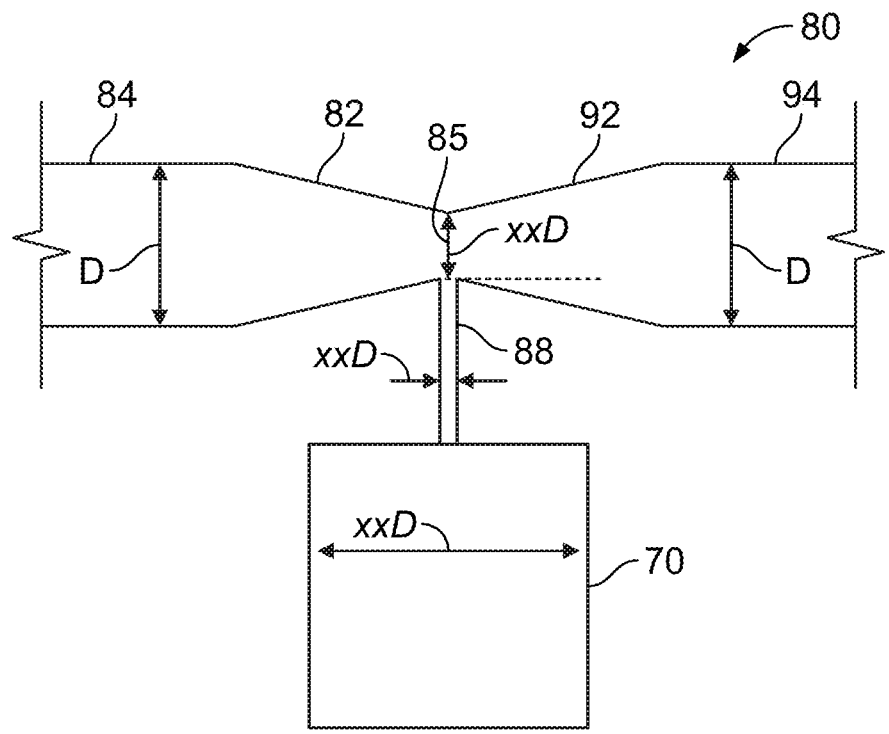
FIG. 11A is a schematic view of a venturi showing various dimensional proportions.
Figure 11B:
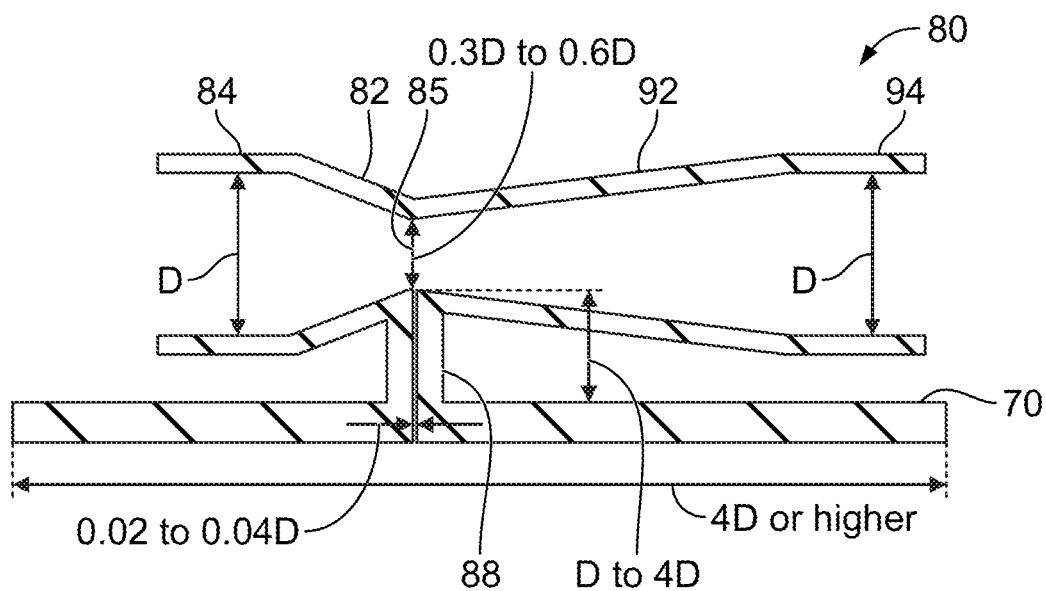
FIG. 11B is a schematic view of another venturi showing various dimensional proportions.

As shown in FIGS. 11A-11B, a study was used to determine a generic parametric understanding that can be translated into critical ratios, ranges, and values based on flow rates and pressures since the specific geometry and size of the venturi 80 affects the flow rate from the water canister 70 to the filter inlet 32. Simulations were performed with inputs as the flow rates, the pressure differential, and critical dimensions as ratios with reference to the inner diameter D of the filter inlet 32 (as shown in FIG. 11A, which may be equal to the inner diameter of the second cylindrical section 94 (and potentially also the first cylindrical section 84)). The validity or constraints for all of the designs is to avoid any fluid backflow through the capillary 88 and for the vertical velocity within the water canister 70 to be less than the water droplet settling velocity. The end result provides parametric ratios with reference to the inlet diameter D for a wide range of product sizes and applications.

FIG. 11B shows exemplary ranges of working ratios (as a function of inlet diameter D) within a portion of the fuel system 20 for a wide range of flow rates based on the outcome of the run. In FIG. 11B, the angle of the first conical section 82 is approximately 21° and the angle of the second conical section. 92 is approximately 7°. The water droplet size for the simulations was 300 microns, Which is a very conservative estimate. As shown in FIG. 11B, the inner diameter of the constricted section 85 can range between approximately 0.3*D to 0.6*D, the length of the capillary 88 can range between approximately D to 4*D, the inner diameter of the capillary 88 can range between approximately 0.02*D to 0.04*D, and the width of the water canister 70 can be approximately 4*D or higher, where D is the inner diameter of the filter inlet 32. It is noted that the inner diameter of the capillary 88 is much more important than the length of the capillary 88, The length of the capillary 88 may be approximately 10 to 30 mm for most flow rates.

Additionally, as determined in various studies, the velocity of flow through the water canister 70 is much smaller than the water particle or droplet settling velocity, which means that a separated water particle (even as small as 300 microns) within the water canister 70 will not flow upward with the rising flow inside the water canister 70 (and will not be carried up and out of the water canister 70, through the venturi 80, and into the filter inlet 32), but instead will settle at the bottom of the water canister 70 due to gravity.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terries "coupled," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially, claimed as such, one or more features from a claimed combination can in some cases be excised from the combination, and the claimed combination may be directed to a subcombination or variation of a subcombination.

What is claimed is:

1. A water drain assembly for draining water from a filter assembly, the water drain assembly comprising:
    a conduit;
    a water canister, the conduit fluidly connecting a bottom portion of the filter assembly to a bottom portion of the water canister,
    a venturi comprising:
        a first venturi inlet that allows fluid to flow from a fuel tank and into the venturi,
        a second venturi inlet that allows fluid to flow from the water canister and into the venturi, and
        a venturi outlet that allows fluid the flow from the venturi and into the filter assembly,
    wherein the filter assembly, the conduit, the water canister and the venturi form a closed flow loop that does not include the fuel tank.

2. The water drain assembly of claim 1, wherein the second venturi inlet comprises a capillary fluidly connected to the top of the water canister.

3. The water drain assembly of claim 2, wherein the capillary has a length in a range of 1 to 4 times a diameter of a filter inlet of the filter assembly.

4. The water drain assembly of claim 3, wherein the capillary has an inner diameter in a range of 0.02 to 0.04 times the diameter of the filter inlet.

5. The water drain assembly of claim 4, wherein the water canister has a width which is equal to or greater than 4 times the diameter of the filter inlet.

6. The water drain assembly of claim 1, wherein fluid flows into the conduit of the water drain assembly from the bottom portion of the filter assembly after flowing through and being filtered by the filter assembly.

7. The water drain assembly of claim 1, wherein inlet suction through the venturi causes fluid to flow out of the water canister and into the filter inlet of the filter assembly.

8. The water drain assembly of claim 1, wherein the venturi is positioned upstream of the filter assembly.

9. The water drain assembly of claim 1, wherein fluid is continuously drained from the filter assembly and into the canister when the filter assembly is being used.

10. The water drain assembly of claim 1, wherein the water canister comprises a collecting jacket configured to be positioned peripherally around at least a portion of the filter assembly.

11. The water drain assembly of claim 10, further comprising a check valve positioned upstream of the conduit, the check valve configured to prevent water or fuel from flowing upstream thereof into the filter assembly.

12. The water drain assembly of claim 10, further comprising:
- a support ring positioned inside the water canister surrounding the second venturi inlet; and
- a filter media patch positioned along and attached to ends of the support ring located distal from the second venturi inlet.

13. A fuel system comprising:
- a fuel tank configured to contain fuel to be filtered;
- a filter assembly filtering the fuel from the fuel tank;
- a pump that draws the fuel through the filter assembly; and
- a water drain assembly for draining water from the filter assembly, the water drain assembly comprising:
  - a conduit,
  - a water canister, the conduit fluidly connecting a bottom portion of the filter assembly to a bottom portion of the water canister,
  - a venturi comprising:
    - a first venturi inlet that allows fluid to flow from the fuel tank and into the venturi,
    - a second venturi inlet that allows fluid to flow from the water canister and into the venturi, and
    - a venturi outlet that allows fluid to flow from the venturi and into the filter assembly wherein the filter assembly, the conduit, the water canister and the venturi form a closed flow loop that does not include the fuel tank.

14. The fuel system of claim 13, wherein the second venturi inlet comprises a capillary fluidly connected to the top of the water canister.

15. The fuel system of claim 14, wherein the capillary has a length in a range of 1 to 4 times a diameter of a filter inlet of the filter assembly.

16. The fuel system of claim 15, wherein the capillary has an inner diameter in a range of 0.02 to 0.04 times the diameter of the filter inlet.

17. The fuel system of claim 13, further comprising:
- a support ring positioned inside the water canister surrounding the second venturi inlet; and
- a filter media patch positioned along and attached to ends of the support ring located distal from the second venturi inlet.

18. The fuel system of claim 14, wherein fluid flows from the fuel tank, through the venturi, into the filter assembly, through the conduit, into the water canister, through the capillary of the venturi, and back into the filter assembly through the filter inlet.

19. The fuel system of claim 13, wherein inlet suction is created from fuel flowing from the fuel tank, through the venturi, and into the filter assembly, wherein the inlet suction draws fluid from a bottom portion of the filter assembly into the water canister.

20. The fuel system of claim 13, wherein the water drain assembly is positioned downstream of the fuel tank and upstream of the pump.

21. The fuel system of claim 13, wherein fuel flows from the fuel tank, through the venturi, and into the filter assembly, which creates an inlet suction through the venturi that causes fluid to flow out of the water canister and into the filter inlet of the filter assembly.

22. The fuel system of claim 13, wherein the water canister comprises a collecting jacket position peripherally around at least a portion of a filter shell of the filter assembly.

23. The fuel system of claim 13, further comprising a check valve positioned at the bottom of the filter assembly upstream of the conduit, the check valve configured to prevent water or fuel from flowing upstream thereof into the filter assembly.

* * * * *